United States Patent
Komatsu et al.

[19]

[11] Patent Number: 5,886,650
[45] Date of Patent: Mar. 23, 1999

[54] CAR NAVIGATION SYSTEM WITH FM MULTI-BROADCAST SIGNAL RECEIVING FUNCTION

[75] Inventors: Motoi Komatsu; Masashige Yamasaki, both of Kanagawa, Japan

[73] Assignee: Mitsumi Electric Co., Ltd., Tokyo, Japan

[21] Appl. No.: 961,066

[22] Filed: Oct. 30, 1997

[30] Foreign Application Priority Data

Oct. 31, 1996 [JP] Japan ..................... 8-305596

[51] Int. Cl.⁶ .................................. G08G 1/123
[52] U.S. Cl. ................ 340/988; 340/995; 701/211
[58] Field of Search .................... 340/988, 990, 340/995, 905; 701/208, 211

[56] References Cited

U.S. PATENT DOCUMENTS

| | | | |
|---|---|---|---|
| 5,189,430 | 2/1993 | Yano et al. ..................... | 340/995 |
| 5,293,163 | 3/1994 | Kakihara et al. ............... | 340/995 |
| 5,323,321 | 6/1994 | Smith, Jr. ...................... | 340/995 |
| 5,406,490 | 4/1995 | Braegas ......................... | 340/905 |
| 5,436,623 | 7/1995 | Terada et al. .................. | 340/995 |
| 5,565,874 | 10/1996 | Rode ............................ | 340/995 |

FOREIGN PATENT DOCUMENTS 0322573  7/1989  European Pat. Off. .......... 340/995

OTHER PUBLICATIONS

Electronics, Aug. 18, 1977, vol. 50, No. 17 "Electronic Navigator Gives Driver Highway Data", 340–905.

*Primary Examiner*—Brent A. Swarthout
*Attorney, Agent, or Firm*—Whitham, Curtis & Whitham

[57] ABSTRACT

A car navigation system with an FM multi-broadcast signal receiving function has: a function of displaying a current position on a display 17a according to position data which is received through a GPS antenna 12 from a satellite; and an FM multi-data display unit 17 which is arranged on a dash board 31 in front of the driver's seat of a vehicle.

3 Claims, 2 Drawing Sheets

CAR NAVIGATION SYSTEM WITH FM MULTI-BROADCAST SIGNAL RECEIVING FUNCTION

BACKGROUND OF THE INVENTION

1. Field of the Invention

This invention relates to a car navigation system with an FM multi-broadcast signal receiving function.

2. Related Art

A car navigation system is to guide a vehicle to a destination set even if the driver does not know a map to the destination (a way to the destination). Recently, a car navigation system has been proposed in the art which is designed as follows: By receiving road data superposed on an FM broadcast signal, the driver foresees a direction of movement and how crowded a road to the destination is, and, if necessary, sets a detour route.

In general, in a car navigation system, its display is arranged near the console beside the driver's seat or near the part of the dash board which is located away from the driver's seat, and its FM receiver incorporating an FM multi-data display unit is arranged in the console. Hence, when necessary, the driver must look aside while confirming the road condition in the direction of drive movement, and in addition he must read the data displayed on the FM multi-data display unit built in the FM receiver. Hence, the frequency of the driver's looking aside is high or the time required for the driver to look aside is long, which increases the possibility of occurrence of vehicle accidents.

SUMMARY OF THE INVENTION

The foregoing problem has been solved by the provision of a car navigation system with an FM multi-broadcast signal receiving function, which, according to the invention, has a function of displaying a current position on a display according to position data which is received through a GPS antenna from a satellite; and an FM multi-data display unit which is arranged on a dash board in front of the driver's seat of a vehicle.

With the system, the driver is able to confirm the data displayed on the FM multi-data display unit while confirming road conditions in the direction of movement of the vehicle. Hence, with the car navigation system of the invention, when compared with the conventional one, the frequency of the driver's looking aside is low or the time required for the driver to look aside is short, which decreases the possibility of occurrence of vehicle accidents.

BRIEF DESCRIPTION OF THE DRAWING(S)

DETAILED DESCRIPTION OF THE PREFERRED EMBODIMENTS

Figure 1:
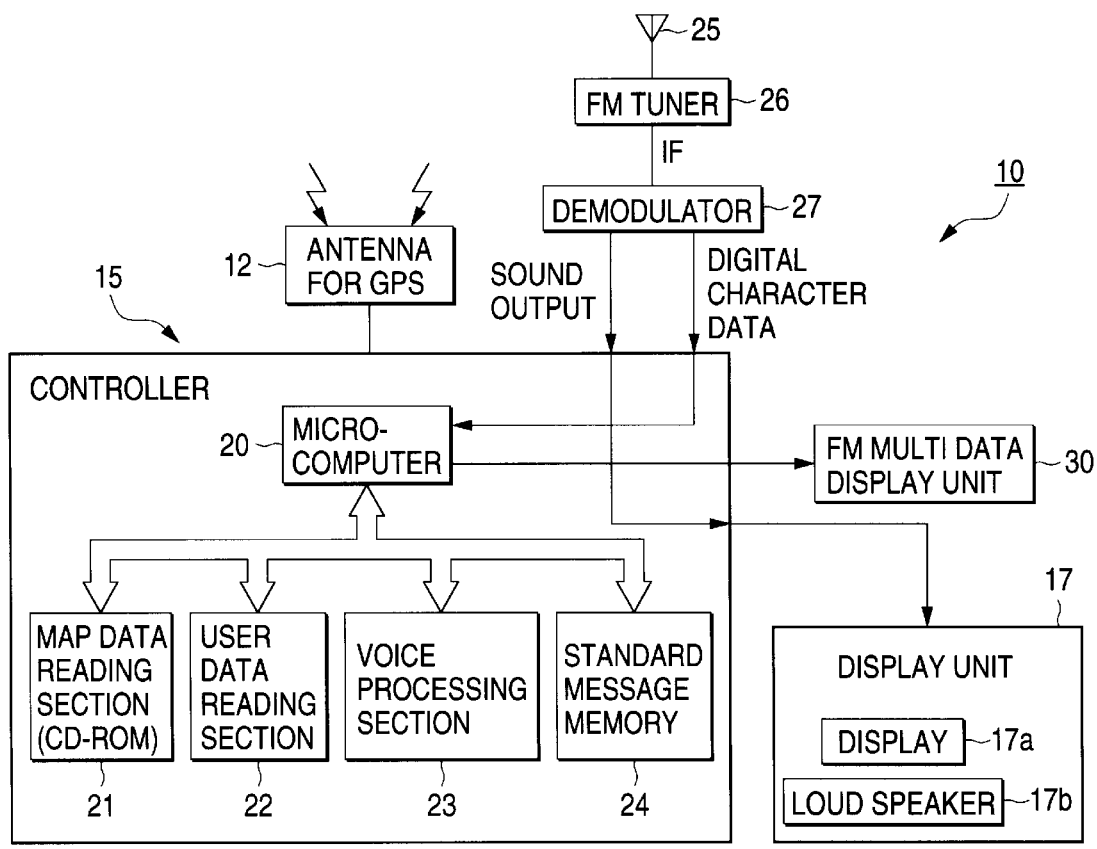
FIG. 1 is a system diagram showing an example of a car navigation system with an FM multi-broadcast signal receiving function, which constitutes an embodiment of the invention.
Figure 2:
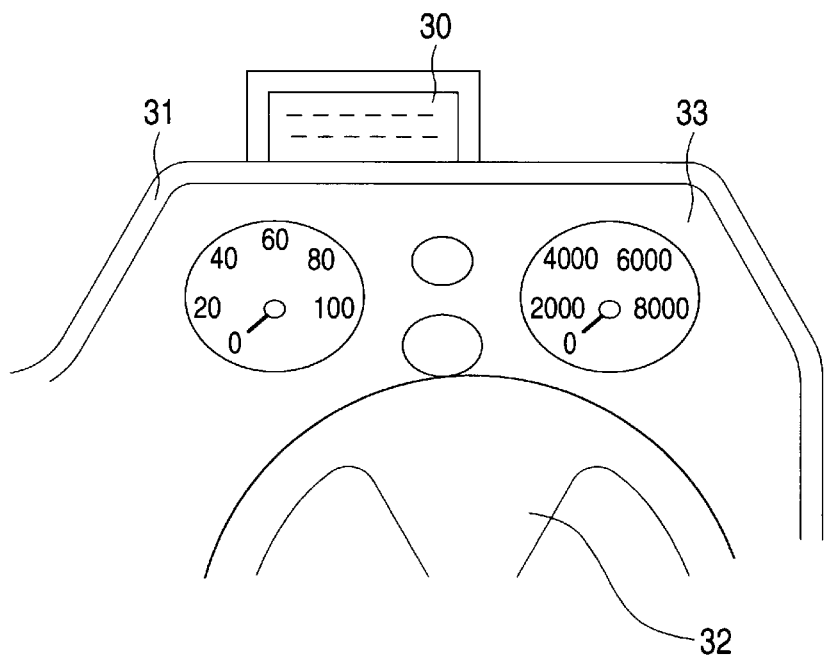
FIG. 2 is a diagram showing an example of an FM multi-data display unit mounted on the panel meter in front of a driver's seat.

FIG. 2 is a system diagram showing the arrangement of an example of a car navigation system with an FM multi-broadcast signal receiving function, which constitutes an embodiment of the invention. FIG. 2 shows an example of an FM multi-indicator installed on a panel meter in front of a driver's seat.

As shown in those figures, a car navigation system 10 has a controller 15 which receives position data through a GPS antenna 12 from a satellite. The controller 15 is designed as follows: That is, the controller 15 utilizes position data received from a satellite to display a current (present) position on the display 17a of an image display unit 17, and to vocally perform a road guide to a destination by means of a loudspeaker 17b. In this case, the controller 15 comprises: conventional circuit elements for car navigation such as a micro-computer 20, a map data reading section 21 using a CD-ROM, a voice processing section 23, and a standard message memory 24.

In the invention, the controller 15 has an FM antenna 25, an FM tuner 26, and a demodulator 27. That is, a signal is received by the FM tuner 26 through the FM antenna, where it is converted into an IF signal. The IF signal is applied to the demodulator 27, where it is demodulated into road data which is FM multi-broadcast digital character data. The road data is applied to the micro-computer 20, so that the road data are displayed on an FM multi-data display unit, namely, an FM character display unit 30. The FM character display unit 30 is located on a dash board 31 in front of the driver's seat of a vehicle. In FIG. 2, reference numeral 32 designates a steering wheel; and 33, a display panel for instruments such as a speed-meter and a revolution-indicator.

With this arrangement, the driver, while confirming road conditions in the direction of movement of the vehicle, can confirm character data displayed on the FM character display unit 30 (the FM multi-data display unit). Hence, the frequency of a driver's looking aside, or the time required for a driver to look aside is decreased. This means, the possibility of occurrence of car accidents is also decreased.

Figure 3:
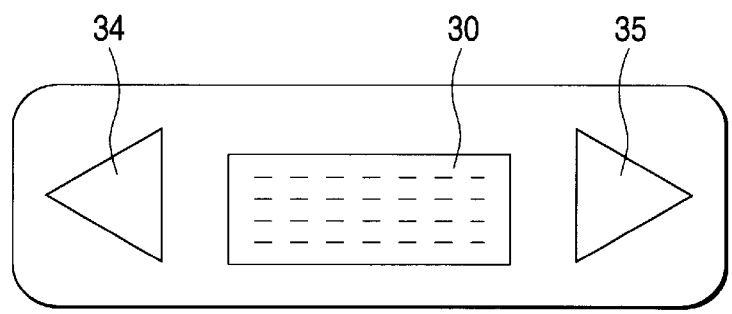
FIG. 3 is a diagram showing another example of an FM multi-data display unit.

FIG. 3 is a diagram for a description of another example of the car navigation system, which constitutes a second embodiment of the invention. More specifically, FIG. 3 shows another example of the FM multi-data display unit. Movement-direction displaying sections 34 and 35 for road guide are provided on both sides of the FM character display unit 30.

With this arrangement, in a navigation mode with a destination set, the driver is able to operate his vehicle while confirming a present position on the display 17a with a direction of movement being vocally indicated with the loudspeaker and watching the movement direction displaying sections 34 and 35 of the FM multi-data display unit (mounted on the dash board 31 in front of the driver's seat) to confirm the change in movement direction to the right or left. By watching the movement direction displaying sections 34 and 35, the driver can confirm the change in movement direction to the right or left. Hence, the frequency of the driver's watching the display is reduced, and the frequency of the driver's looking aside is decreased, which contributes to safe driving.

As was described above, in the car navigation system with the FM broadcast signal receiving function according to the invention, the FM character display unit is arranged near the dash board in front of the driver's seat. The driver is able to confirm road data (which are FM multi-broadcast digital data) without adversely affecting the driving of the vehicle. Furthermore, the movement-direction displaying sections for road guide are provided on both sides of the FM character display unit 30, respectively. This feature makes it possible for the driver to operate the vehicle while watching the movement direction displaying sections of the FM multi-data display unit (arranged near the dash board in front of the driver's seat) to confirm the change in movement direction to the right or left. Particularly, by watching the movement-direction display sections 34 and 35 of the FM multi-data display unit, the driver can confirm the change in movement direction. Hence, the frequency of the driver's watching the display is reduced, and the frequency of the driver's looking aside is decreased, which contributes to safe driving.

What is claimed is:

1. A car navigation system with an FM multi-broadcast signal receiving function comprising:

a display for displaying a current position of the car on a display according to position data which is received through a GPS antenna from a satellite, said display having an FM multi-data display unit which is arranged in a driver's line of sight while viewing a roadway, said FM multi-data display having direction indicating icons on both sides of said display to confirm desired direction of movement, the icons being displayed in display sections which are separate from a main display section which displays radio transmitted traffic advisories in character format from broadcast signals, and the current position.

2. A car navigation system with an FM multi-broadcast signal receiving function as claimed in claim 1, wherein said FM multi-data display unit is an FM character display unit.

3. The car navigation system as recited in claim 1 wherein said display unit is positioned in, a housing which is mounted on said dashboard of said vehicle.

* * * * *